(12) United States Patent
Rikitake et al.

(10) Patent No.: US 11,192,505 B2
(45) Date of Patent: Dec. 7, 2021

(54) ROCKER EXTERIOR COMPONENT STRUCTURE

(71) Applicants: TOYOTA JIDOSHA KABUSHIKI KAISHA, Aichi-ken (JP); SEKISO CORPORATION, Aichi Prefecture (JP)

(72) Inventors: Syunsuke Rikitake, Toyota (JP); Kenji Hayashi, Toki (JP); Tatsuhiro Komito, Okazaki (JP)

(73) Assignees: TOYOTA JIDOSHA KABUSHIKI KAISHA, Aichi-ken (JP); SEKISO CORPORATION, Aichi Prefecture (JP)

( * ) Notice: Subject to any disclaimer, the term of this patent is extended or adjusted under 35 U.S.C. 154(b) by 0 days.

(21) Appl. No.: 16/823,244

(22) Filed: Mar. 18, 2020

(65) Prior Publication Data

US 2020/0298771 A1    Sep. 24, 2020

(30) Foreign Application Priority Data

Mar. 20, 2019    (JP) .............................. JP2019-053155

(51) Int. Cl.
*B60R 13/04*    (2006.01)
*B60R 13/08*    (2006.01)

(52) U.S. Cl.
CPC ........ *B60R 13/043* (2013.01); *B60R 13/0815* (2013.01)

(58) Field of Classification Search
CPC .............. B60R 13/043; B60R 13/0815; B60R 13/0861; B60R 2013/046; B60R 13/04; B60R 13/08; B62D 25/20

USPC ............................................ 296/193.05, 209
See application file for complete search history.

(56) References Cited

U.S. PATENT DOCUMENTS

| | | | | |
|---|---|---|---|---|
| 5,806,915 | A * | 9/1998 | Takabatake | ........... B29C 44/188 296/187.02 |
| 6,979,054 | B2 * | 12/2005 | Yamamoto | .............. B60R 13/04 296/209 |
| 7,159,933 | B2 * | 1/2007 | Yamamoto | ................ B60R 3/00 296/209 |
| 8,465,089 | B2 * | 6/2013 | Atkinson | ................ B60R 13/04 296/209 |
| 2004/0185223 | A1 * | 9/2004 | Yamamoto | .......... B29C 45/1704 428/99 |
| 2006/0066139 | A1 | 3/2006 | Futatsuhashi | |

(Continued)

FOREIGN PATENT DOCUMENTS

| | | |
|---|---|---|
| JP | H1029472 A | 2/1998 |
| JP | 2007-261480 A | 10/2007 |
| JP | 2014-28603 A | 2/2014 |

*Primary Examiner* — Pinel E Romain
(74) *Attorney, Agent, or Firm* — Hauptman Ham, LLP

(57) ABSTRACT

A rocker molding includes a vertical wall portion provided under a rocker in a vehicle upper-lower direction, a bottom wall portion extending from a lower end portion of the vertical wall portion to an outer side in a vehicle width direction, and a side wall portion extending upwardly in the vehicle upper-lower direction from an outer end portion of the bottom wall portion in the vehicle width direction. A sound absorbing material is provided in a penetrating portion that is provided in a grange from a portion of the vertical wall portion to an inner portion of the bottom wall portion in the vehicle width direction.

20 Claims, 3 Drawing Sheets

(56) References Cited

U.S. PATENT DOCUMENTS

2006/0131104 A1* 6/2006 Yamaguchi ............. B60R 13/08
                                                        181/293
2019/0244598 A1* 8/2019 Otsuka ................... B32B 37/00
2020/0140021 A1* 5/2020 Grottke ................. B62D 27/06

* cited by examiner

ROCKER EXTERIOR COMPONENT STRUCTURE

INCORPORATION BY REFERENCE

The disclosure of Japanese Patent Application No. 2019-053155 filed on Mar. 20, 2019 including the specification, drawings and abstract is incorporated herein by reference in its entirety.

BACKGROUND

1. Technical Field

The disclosure relates to a rocker exterior component structure.

2. Description of Related Art

A structure is known in which a rocker (also referred to as a "side sill") having a closed section structure is arranged in a lower end of a side portion of a vehicle, and also a rocker molding (also referred to as a "side sill garnish") is attached to the rocker (see Japanese Unexamined Patent Application Publication No. 2014-28603 (JP 2014-28603 A), and Japanese Unexamined Patent Application Publication No. 2007-261480 (JP 2007-261480 A)). For example, JP 2014-28603 A stated above discloses a structure in which a rocker molding is attached to an outer part of a rocker outer panel in a vehicle width direction. The rocker outer panel configures a part of a rocker. In this structure, the rocker molding includes a projecting portion that projects downwardly in a vehicle upper-lower direction under a lower wall portion of the rocker outer panel. Also, a sound absorbing material having an almost U-shape in a vehicle front view is attached to outer surfaces including a lower surface of the projecting portion of the rocker molding. Then, the sound absorbing material absorbs noise.

SUMMARY

However, in the foregoing related art, an amount of the sound absorbing material used increases. In addition, there is a room for improvement in terms of an effective reduction of noise that tries to pass under the rocker in the vehicle upper-lower direction from a vehicle underfloor space to an outer side in the vehicle width direction.

The disclosure provides a rocker exterior component structure that is able to effectively reduce noise while an amount of a sound absorbing material used is restricted, the noise trying to pass under a rocker in a vehicle upper-lower direction from a vehicle underfloor space to an outer side in a vehicle width direction.

A rocker exterior component structure according to a first aspect of the disclosure includes a rocker molding and a sound absorbing material. The rocker molding is provided in a rocker from an outer part of the rocker in a vehicle width direction through a lower part of the rocker in a vehicle upper-lower direction. The rocker is provided in a lower end portion of a vehicle side part and extends along a vehicle front-rear direction. The rocker molding includes a vertical wall portion, a bottom wall portion, and a side wall portion. The vertical wall portion is provided under the rocker in the vehicle upper-lower direction and extends along the vehicle front-rear direction, and the bottom wall portion extends from a lower end portion of the vertical wall portion to an outer side in the vehicle width direction. The side wall portion extends upwardly in the vehicle upper-lower direction from an outer end portion of the bottom wall portion in the vehicle width direction and includes a portion facing the vertical wall portion. A penetrating portion is provided in the rocker molding and extends through the rocker molding in a range from a range from the vertical wall portion to an inner portion of the bottom wall portion in the vehicle width direction. The sound absorbing material is provided in the penetrating portion and absorbs a sound wave.

With the foregoing configuration, a sound wave from an inner side of the rocker in the vehicle width direction is absorbed by the sound absorbing material provided in the penetrating portion of the rocker molding. Since the penetrating portion extends through the rocker molding in a range from a portion of the vertical wall portion to the inner portion of the bottom wall portion in the vehicle width direction, the sound wave from the inner side of the rocker in the vehicle width direction partially passes through the sound absorbing material while being absorbed by the sound absorbing material in a wide range in the vehicle upper-lower direction. The sound wave that passes through the sound absorbing material from the inner side in the vehicle width direction travels through the air in an inner space of a shaped portion of the rocker molding from the vertical wall portion through the side wall portion, is reflected by the side wall portion, travels through the air in the inner space again, and is then absorbed by the sound absorbing material. With the structure in which the sound wave travels through the air inside the inner space and enters the sound absorbing material again, frequency of a sound wave that re-enters the sound absorbing material can be set to meet a frequency band of sound that is desired to be absorbed only with a change of the shape of the shaped portion from the vertical wall portion through the side wall portion. With such a setting, it is possible to obtain a structure that is able to effectively absorb a sound wave at the frequency band of sound that is desired to be absorbed while an amount of use of the sound absorbing material is restricted.

The rocker molding may be set so such the vertical wall portion, a lateral wall portion, and a hanging wall portion diffract a sound wave of noise that travels to the outer side in the vehicle width direction from a vehicle underfloor space and lead the sound wave to the penetrating portion. The lateral wall portion extends under the rocker in the vehicle upper-lower direction from an upper end portion of the vertical wall portion to an inner side in the vehicle width direction, and the hanging wall portion extends downwardly in the vehicle upper-lower direction from an inner end portion of the lateral wall portion in the vehicle width direction.

With the foregoing configuration, the sound wave of noise that travels from the vehicle underfloor space to the outer side in the vehicle width direction is diffracted and led to the penetrating portion by the hanging wall portion, the lateral wall portion, and the vertical wall portion of the rocker molding. Thus, sound pressure in a space between the hanging wall portion, and a vertical wall-shaped portion that is composed of parts of the vertical wall portion and the sound absorbing material becomes higher than sound pressure in a space positioned under the space in the vehicle upper-lower direction. Therefore, the sound wave is absorbed efficiently by the sound absorbing material provided in the penetrating portion.

A portion of the rocker molding may be bent into a curved shape in a vehicle front view. The portion ranges from the lower end portion of the vertical wall portion to an inner end portion of the bottom wall portion in the vehicle width direction. A curved portion may be provided in a lower end portion of the sound absorbing material. The curved portion is bent into a curved shape towards the outer side in the vehicle width direction along the penetrating portion in the vehicle front view.

With the foregoing configuration, for example, a part of the sound wave that enters the upper portion of the sound absorbing material, the sound wave trying to travel to the outer side in the vehicle width direction along the curved portion, is also absorbed.

As described so far, with the rocker exterior component structure according to the disclosure, an excellent effect is obtained with which noise that tries to pass to the outer side in the vehicle width direction from the vehicle underfloor space under the rocker in the vehicle upper-lower direction is reduced effectively while an amount of the sound absorbing material used is restricted.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A rocker exterior component structure according to an embodiment of the disclosure is described with reference to FIG. 1 to FIG. 3. An arrow FR shown as appropriate in these drawings represents a vehicle frontward direction, an arrow UP represents a vehicle upward direction, an arrow W represents a vehicle width direction, and an arrow OUT represents an outer side in the vehicle width direction.

Configuration of the Embodiment

Figure 1:
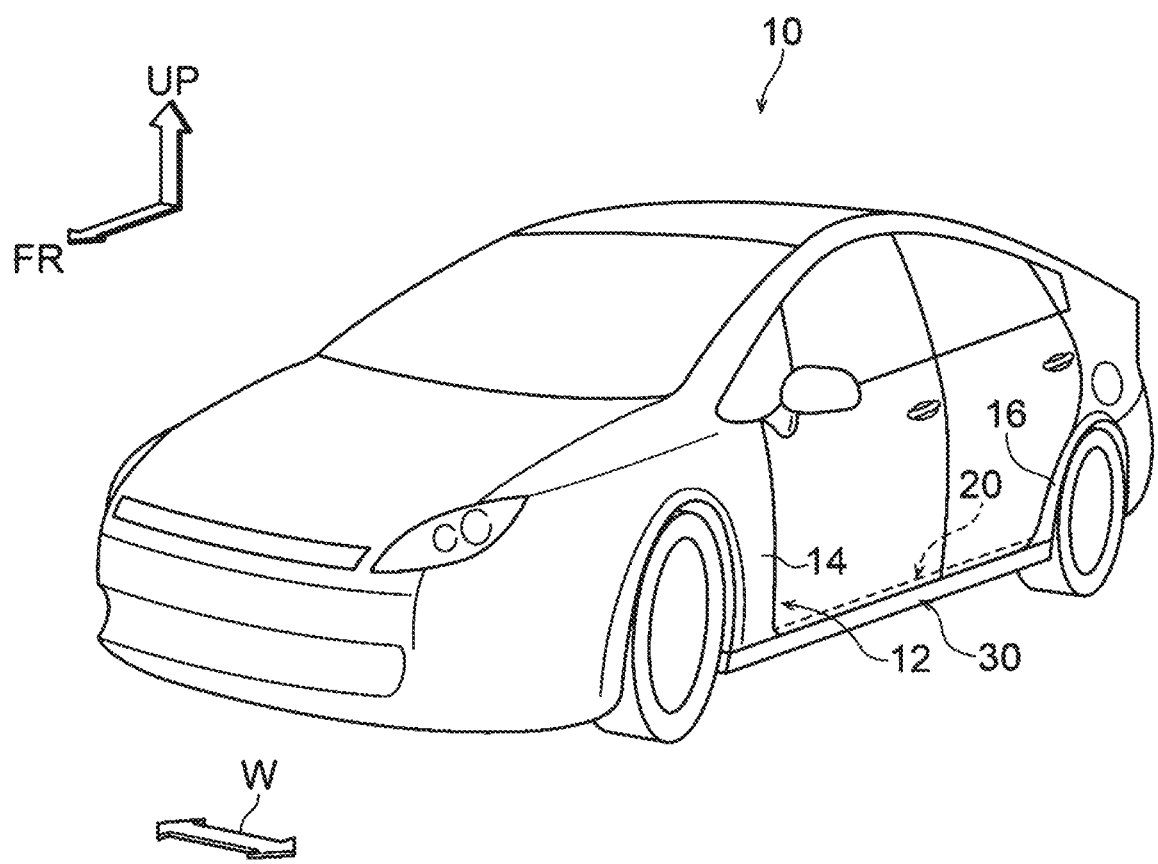
FIG. 1 is a perspective view of a vehicle that includes a rocker exterior component structure according to an embodiment of the disclosure.

FIG. 1 is a perspective view of a vehicle 10 that includes the rocker exterior component structure according to the embodiment. As shown in FIG. 1, a rocker 20 extending along a vehicle front-rear direction is arranged in a lower end portion of a vehicle side part 12. The rocker 20 configures a vehicle skeleton member and is connected with a lower end portion of a front pillar 14, a lower end portion of a center pillar (not shown), and a front end portion of a quarter wheel house 16.

Figure 2:
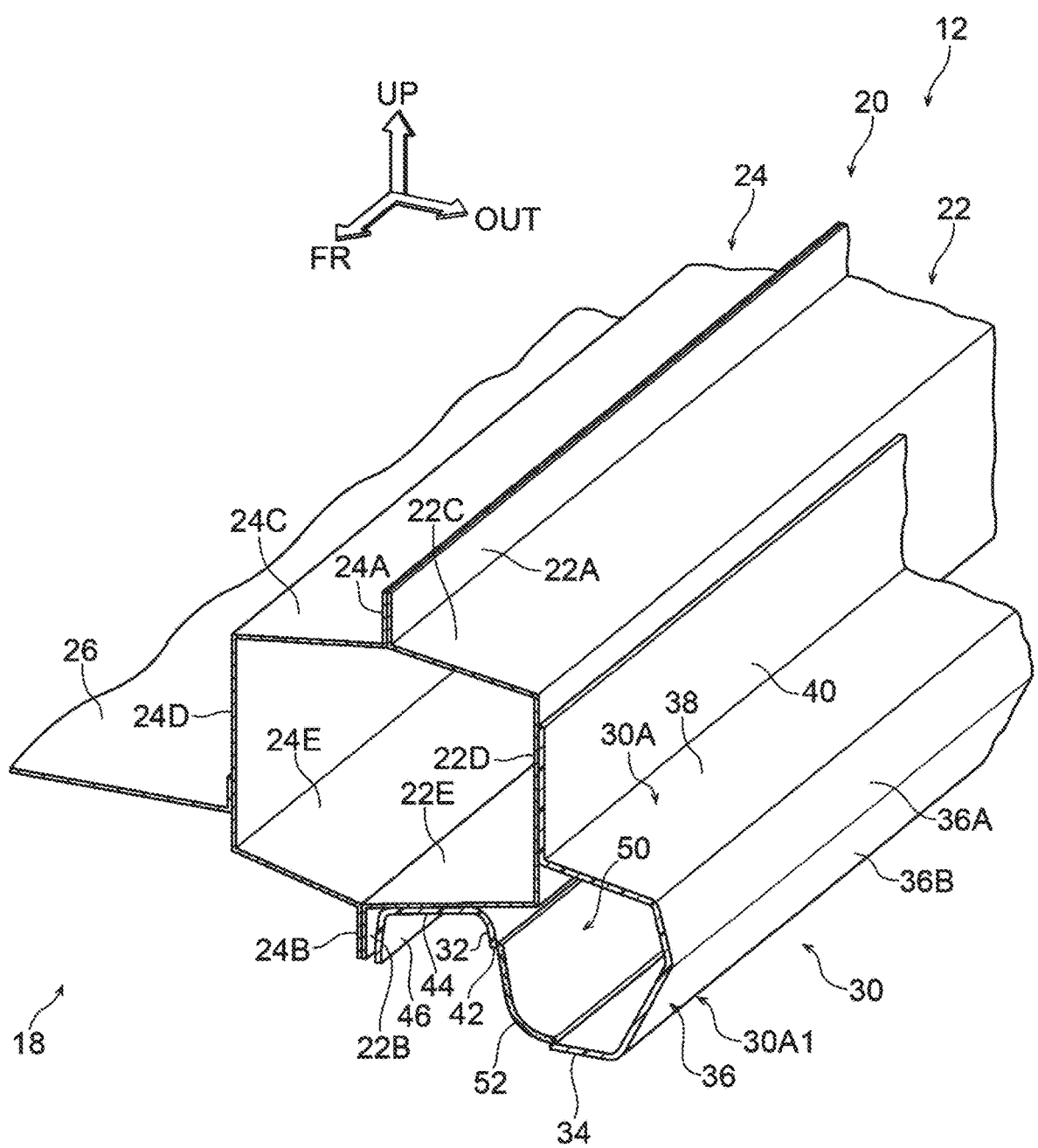
FIG. 2 is a perspective view that shows a part of a lower portion of the vehicle that includes the rocker exterior component structure according to the embodiment of the disclosure.

FIG. 2 is a perspective view showing a part of the vehicle lower part in which the rocker exterior component structure according to the embodiment is provided. As shown in FIG. 2, the rocker 20 includes a rocker outer panel 22 arranged outside of a vehicle cabin and a rocker inner panel 24 arranged inside of the vehicle cabin. The rocker outer panel 22 is formed so as to have a hat-shaped section in a vehicle front view. In the hat-shaped section, an opening faces an inner side in the vehicle width direction. The rocker inner panel 24 is formed so as to have a hat-shaped section in the vehicle front view. In the hat-shaped section, an opening faces an outer side in the vehicle width direction. Then, an upper flange 22A of the rocker outer panel 22 and an upper flange 24A of the rocker inner panel 24 are joined to each other by spot welding. Also, a lower flange 22B of the rocker outer panel 22 and a lower flange 24B of the rocker inner panel 24 are joined to each other by spot welding. Thus, the rocker 20 is formed into a structure having a closed hollow section and extending along the vehicle upper-lower direction.

An upper part of the rocker outer panel 22 includes an upper wall portion 22C that is bent and extends from a lower end portion of the upper flange 22A to the outer side in the vehicle width direction. A lower part of the rocker outer panel 22 includes a lower wall portion 22E that is bent and extends from an upper end portion of the lower flange 22B to the outer side in the vehicle width direction. An intermediate part of the rocker outer panel 22 in the vehicle upper-lower direction includes an outer wall portion 22D. End portions of the upper wall portion 22C and the lower wall portion 22E on the outer side in the vehicle width direction are connected with each other in the vehicle upper-lower direction through the outer wall portion 22D. An upper part of the rocker inner panel 24 includes an upper wall portion 24C that is bent and extends to the inner side in the vehicle width direction from a lower end portion of the upper flange 24A. A lower part of the rocker inner panel 24 includes a lower wall portion 24E that is bent and extends to the inner side in the vehicle width direction from an upper end portion of the lower flange 24B. An intermediate part of the rocker inner panel 24 in the vehicle upper-lower direction includes an inner wall portion 24D. End portions of the upper wall portion 24C and the lower wall portion 24E on the inner side in the vehicle width direction are connected with each other through the inner wall portion 24D in the vehicle upper-lower direction. Further, an end portion of a floor panel 26 on the outer side in the vehicle width direction is joined to a lower part of the inner wall portion 24D of the rocker inner panel 24.

Figure 3:
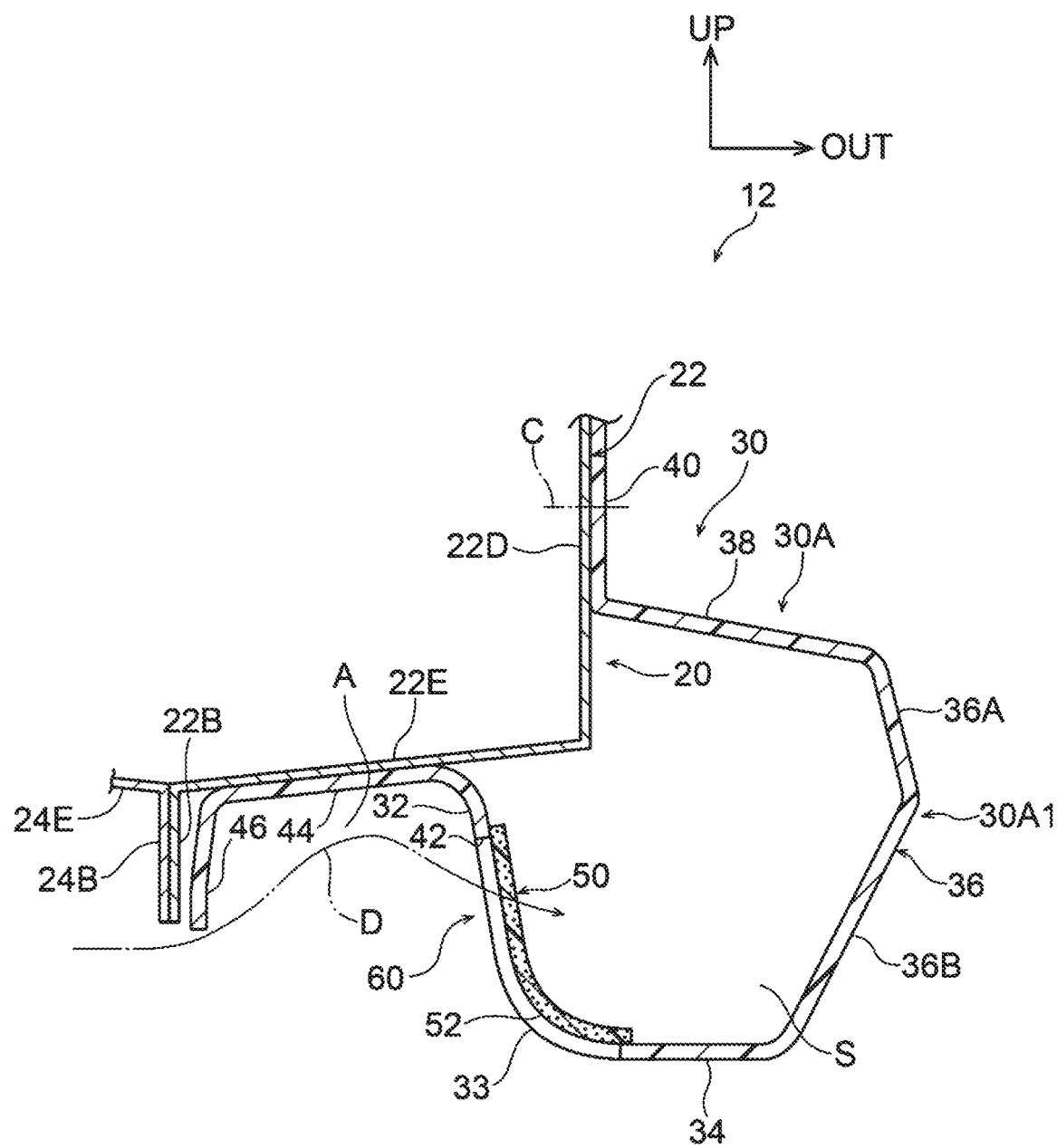
FIG. 3 is a longitudinal sectional view from a front side of the vehicle, the view showing the rocker exterior component structure according to the embodiment of the disclosure.

FIG. 3 shows a longitudinal sectional view from the front side of the vehicle, the view showing the rocker exterior component structure according to the embodiment. As shown in FIG. 2 and FIG. 3, a rocker molding 30 is provided from an outer part of the rocker 20 in the vehicle width direction through a lower part of the rocker 20 in the vehicle upper-lower direction. The rocker molding 30 is made of resin, and extends along the vehicle front-rear direction.

In an upper part of the rocker molding 30, a vertical wall shaped flange portion 40 is formed. The flange portion 40 is attached to the outer wall portion 22D of the rocker outer panel 22 through a plurality of fixtures (not shown). The fixtures are, for example, clips that are inserted into mounting holes (not shown) provided in the outer wall portion 22D of the rocker outer panel 22, and are provided in a plurality of places in the vehicle front-rear direction, respectively. In FIG. 3, a one dot chain line C shows an example of a position of an insertion central axis of one of the fixtures in the vehicle upper-lower direction.

As shown in FIG. 2 and FIG. 3, the rocker molding 30 includes a bulge portion 30A that bulges from a lower end portion of the flange portion 40 to the outer side in the vehicle width direction and also obliquely downwardly in the vehicle upper-lower direction with respect to the rocker 20 in the vehicle front view. The bulge portion 30A includes a projecting wall portion 38 and a downward bulge portion 30A1. The projecting wall portion 38 extends to the outer side in the vehicle width direction from the lower end portion of the flange portion 40, and the downward bulge portion 30A1 is formed into an almost U-shape in the vehicle front view and continuous from an outer end portion of the projecting wall portion 38 in the vehicle width direction. Further, as shown in FIG. 3, the downward bulge portion 30A1 includes a vertical wall portion 32, a bottom wall portion 34, and a side wall portion 36. The vertical wall portion 32 is provided under the rocker 20 in the vehicle upper-lower direction and extends along the vehicle front-rear direction. The bottom wall portion 34 extends from a lower end portion of the vertical wall portion 32 to the outer side in the vehicle width direction. The side wall portion 36 extends upwardly in the vehicle upper-lower direction from an outer end portion of the bottom wall portion 34 in the vehicle width direction.

The vertical wall portion 32 is arranged under a part of the lower wall portion 22E of the rocker outer panel 22 in the vehicle upper-lower direction, the part of the lower wall portion 22E being located on the outer side in the vehicle width direction. The vertical wall portion 32 is also slightly inclined to the outer side in the vehicle width direction towards the lower side of the vehicle. Further, the downward bulge portion 30A1 includes a curved portion 33 that is bent in a curved shape in the vehicle front view. The curved portion 33 ranges from a lower end portion of the vertical wall portion 32 to an inner end portion of the bottom wall portion 34 in the vehicle width direction. The bottom wall portion 34 is arranged along a vehicle horizontal direction in the vehicle front view. Further, a lower portion of the side wall portion 36 serves as a lower inclined wall portion 36B that extends upwardly in the vehicle upper-lower direction and is also inclined to the outer side in the vehicle width direction. The lower inclined wall portion 36B is a portion facing the vertical wall portion 32. An upper part of the side wall portion 36 serves as an upper inclined wall portion 36A that extends upwardly in the vehicle upper-lower direction from an upper end portion of the lower inclined wall portion 36B and is also inclined to the inner side in the vehicle width direction.

Meanwhile, a through-hole 42 serving as a penetrating portion is provided ranging from a portion of the vertical wall portion 32 to a part of the bottom wall portion 34 on the inner side in the vehicle width direction. The through-hole 42 extends along the vehicle front-rear direction, and an upper end of the through-hole 42 is set to be positioned in an upper part of the vertical wall portion 32. A sound absorbing material 50 that absorbs a sound wave is provided in the through-hole 42. The sound absorbing material 50 is a porous structure body, and is a sheet-shaped member having a size slightly larger than that of an opening area of the through-hole 42. Then, an outer peripheral portion of the sound absorbing material 50 is attached to an outer peripheral portion of the through-hole 42 from, for example, a side of an inner surface of the downward bulge portion 30A1 with use of an adhesive or the like. As a modification of the embodiment, a structure may be employed in which an outer peripheral portion of a sheet-shaped sound absorbing material similar to the sound absorbing material 50 is attached to the outer peripheral portion of the through-hole 42 from a side of an outer surface of the downward bulge portion 30A1 with use of an adhesive or the like. Also, as another modification, a structure may be employed in which a sheet-shaped sound absorbing material similar to the sound absorbing material 50 is arranged so as to fill the through-hole 42. A curved portion 52 is provided in a lower end portion of the sound absorbing material 50. The curved portion 52 is bent into a curved shape towards the outer side in the vehicle width direction along the through-hole 42 in the vehicle front view.

Further, the rocker molding 30 includes a lateral wall portion 44 that is positioned under the rocker 20 in the vehicle upper-lower direction and extends from an upper end portion of the vertical wall portion 32 to the inner side in the vehicle width direction. The rocker molding 30 also includes a hanging wall portion 46 that extends downwardly in the vehicle upper-lower direction from an inner end portion of the lateral wall portion 44 in the vehicle width direction. The lateral wall portion 44 is arranged along a lower surface of the lower wall portion 22E of the rocker outer panel 22. The hanging wall portion 46 is arranged on the outer side of the lower flange 22B of the rocker outer panel 22 in the vehicle width direction, and also faces the lower flange 22B of the rocker outer panel 22 via a gap. In the embodiment, a lower end of the hanging wall portion 46 is positioned so as to be slightly lower than a lower end of the lower flange 22B of the rocker outer panel 22 in the vehicle upper-lower direction. A lower end of the sound absorbing material 50 is positioned so as to be lower than the lower end of the hanging wall portion 46 in the vehicle upper-lower direction.

The rocker molding 30 is set so such the hanging wall portion 46, the lateral wall portion 44, and the vertical wall portion 32 diffract a sound wave of noise traveling from a vehicle underfloor space 18 (see FIG. 2) towards the outer side in the vehicle with direction, and lead the sound wave to the through-hole 42 (see an arrow D). As a supplementary description, a gap between the hanging wall portion 46 and the vertical wall portion 32 in the vehicle width direction is set to be a length that allows the sound wave of the noise to be diffracted, for example, as shown by the arrow D in FIG. 3, thus enabling to lead the noise to the through-hole 42. Specifically, it is preferred that the gap between the hanging wall portion 46 and the vertical wall portion 32 in the vehicle width direction be a distance with which noise with frequency that is desired to be reduced enters easily. In other words, a distance that is around a quarter of the wavelength of noise with frequency that is desired to be reduced is preferred. For example, when it is desired to have a sufficient effect in a reduction of noise around 1000 Hz with high sound pressure, it is preferred that the gap between the hanging wall portion 46 and the vertical wall portion 32 in the vehicle width direction be a distance of around, for example, 6.0 cm to 8.5 cm. Target frequency for a vehicle exterior noise reduction is, for example, 500 Hz to 2000 Hz.

Actions and Effects of the Embodiment

Next, actions and effects of the embodiment are described.

In the embodiment, a sound wave from the inner side of the rocker 20 in the vehicle width direction is absorbed by the sound absorbing material 50 provided in the through-hole 42 in the rocker molding 30. The through-hole 42 extends through the rocker molding 30 in a range from a portion of the vertical wall portion 32 to the inner portion of the bottom wall portion 34 in the vehicle width direction. Therefore, in a wide range in the vehicle upper-lower direction, the sound wave from the inner side of the rocker 20 in the vehicle width direction partially passes through the sound absorbing material 50 while being absorbed by the sound absorbing material 50.

The sound wave that passes through the sound absorbing material 50 from the inner side in the vehicle width direction travels through the air in an inner space S of the downward bulge portion 30A1 (in other words, passes through a layer of the air), is reflected by the side wall portion 36, travels through the air in the inner space S of the downward bulge portion 30A1 again (in other words, passes through the layer of the air), and is then absorbed by the sound absorbing material 50. Because this structure allows the sound wave to re-enter the sound absorbing material 50 after the sound wave travels through the air in the inner space S of the downward bulge portion 30A1, frequency of the sound wave that re-enters the sound absorbing material 50 can be set to meet a frequency band of sound that is desired to be absorbed, only with a change of a shape of the downward bulge portion 30A1. With such a setting, it is possible to obtain a structure that is able to effectively absorb the sound wave at the frequency band of sound that is desired to be absorbed while an amount of use of the sound absorbing material 50 is restricted.

Further, in the embodiment, a portion of the rocker molding 30 from the lower end portion of the vertical wall portion 32 to the inner end portion of the bottom wall portion 34 in the vehicle width direction is bent into the curved shape in the vehicle front view. Also, in the lower end portion of the sound absorbing material 50, the curved portion 52 is provided. The curved portion 52 is bent into the curved shape to the outer side in the vehicle width direction along the through-hole 42 in the vehicle front view. Therefore, for example, a part of a sound wave that enters an upper part of the sound absorbing material 50, the sound wave trying to travel to the outer side in the vehicle width direction along the curved portion 52, is also absorbed.

Also, in the embodiment, the sound wave of noise that travels to the outer side in the vehicle width direction from the vehicle underfloor space 18 (see FIG. 2) is diffracted by the hanging wall portion 46, the lateral wall portion 44, and the vertical wall portion 32 of the rocker molding 30, and is lead to the through-hole 42 (see the arrow D). Because of this, sound pressure in a space A between the hanging wall portion 46, and a vertical wall-shaped portion 60 that is composed of parts of the vertical wall portion 32 and the sound absorbing material 50 becomes higher than sound pressure in a space positioned under the space A in the vehicle upper-lower direction. Therefore, a sound wave is absorbed efficiently by the sound absorbing material 50 provided in the through-hole 42.

As described so far, with the rocker exterior component structure according to the embodiment, it is possible to effectively reduce noise that tries to pass to the outer side in the vehicle width direction under the rocker 20 in the vehicle upper-lower direction from the vehicle underfloor space 18 (see FIG. 2) while an amount of the sound absorbing material 50 used is restricted.

Supplemental Description of the Embodiment

Although the effect of noise reduction is smaller than that of the foregoing embodiment, it is possible to employ a structure without the hanging wall portion 46 and the lateral wall portion 44 as a modification of the foregoing embodiment.

Further, in the foregoing embodiment, only one through-hole 42 serving as the penetrating portion is provided so as to extend in the vehicle front-rear direction, as an example. However, a plurality of the through-holes serving as the penetrating portions may be provided along the vehicle front-rear direction. Alternatively, a cut-off portion serving as the penetrating portion may be provided instead of the through-hole 42 or one of or more than one of the through-holes serving as the penetrating portions that are arrayed next to each other in the vehicle front-rear direction.

Further, in the foregoing embodiment, the configuration is preferred in which the rocker molding 30 is provided with the curved portion 33, and the sound absorbing material 50 is provided with the curved portion 52. However, for example, the rocker molding may have a different configuration. In this configuration, the vertical wall portion is bent and extends to the outer side in the vehicle width direction from the lower end portion of the vertical wall portion in the vehicle front view, thereby the bottom wall portion is formed, and a lower end portion of the sound absorbing material is bent into a bent shape to the outer side in the vehicle width direction along the penetrating portion in the vehicle front view.

The foregoing embodiment and the modifications described above may be combined as appropriate and carried out.

An example of the disclosure has been described so far. However, the disclosure is not limited to the foregoing, and various changes may be made to carry out the disclosure without departing from the gist of the disclosure.

What is claimed is:

1. A rocker exterior component structure, comprising:
a rocker molding provided in a rocker from an outer part of the rocker in a vehicle width direction through a lower part of the rocker in a vehicle upper-lower direction, the rocker being provided in a lower end portion of a vehicle side part and extends along a vehicle front-rear direction, the rocker molding including a vertical wall portion provided under the rocker in the vehicle upper-lower direction and extending along the vehicle front-rear direction, a bottom wall portion extending from a lower end portion of the vertical wall portion to an outer side in the vehicle width direction, and a side wall portion extending upwardly in the vehicle upper-lower direction from an outer end portion of the bottom wall portion in the vehicle width direction and including a portion facing the vertical wall portion, in which a penetrating portion is provided in the rocker molding and extends through the rocker molding in a range from a portion of the vertical wall portion to an inner portion of the bottom wall portion in the vehicle width direction; and
a sound absorbing material that is provided in the penetrating portion and absorbs a sound wave.

2. The rocker exterior component structure according to claim 1, wherein the rocker molding is set so such the vertical wall portion, a lateral wall portion, and a hanging wall portion diffract a sound wave of noise that travels to the outer side in the vehicle width direction from a vehicle underfloor space and lead the sound wave to the penetrating portion, the lateral wall portion extending under the rocker in the vehicle upper-lower direction from an upper end portion of the vertical wall portion to an inner side in the vehicle width direction, and the hanging wall portion extending downwardly in the vehicle upper-lower direction from an inner end portion of the lateral wall portion in the vehicle width direction.

3. The rocker exterior component structure according to claim 1, wherein:
a portion of the rocker molding is bent into a curved shape in a vehicle front view, the portion ranging from the lower end portion of the vertical wall portion to an inner end portion of the bottom wall portion in the vehicle width direction; and the sound absorbing material includes a curved portion provided in a lower end portion of the sound absorbing material, the curved portion being bent into a curved shape towards the outer side in the vehicle width direction along the penetrating portion in the vehicle front view.

4. The rocker exterior component structure according to claim 1, wherein the rocker molding is made of resin.

5. The rocker exterior component structure according to claim 1, wherein the sound absorbing material is a porous structure body.

6. A rocker exterior component structure, comprising:
a rocker molding provided in a rocker from an outer part of the rocker in a vehicle width direction through a lower part of the rocker in a vehicle upper-lower direction, the rocker being provided in a lower end portion of a vehicle side part and extending along a vehicle front-rear direction, the rocker molding including:
a bottom wall portion having an outer end portion and an inner end portion opposed to each other in the vehicle width direction,
a vertical wall portion provided under the rocker in the vehicle upper-lower direction and extending along the vehicle front-rear direction, the vertical wall portion extending upwardly in the vehicle upper-lower direction from the inner end portion of the bottom wall portion,
a side wall portion extending upwardly in the vehicle upper-lower direction from the outer end portion of the bottom wall portion, and
a penetrating portion which is provided in the rocker molding and extends through the rocker molding in a range from a portion of the vertical wall portion to the inner end portion of the bottom wall portion; and
a sound absorbing material provided in the penetrating portion to absorb a sound wave.

7. The rocker exterior component structure according to claim 6, wherein
the rocker molding further includes:
a lateral wall portion provided under the rocker in the vehicle upper-lower direction, the lateral wall portion having an outer end portion and an inner end portion opposed to each other in the vehicle width direction, and
a hanging wall portion extending downwardly in the vehicle upper-lower direction from the inner end portion of the lateral wall portion,
the vertical wall portion extends downwardly in the vehicle upper-lower direction from the outer end portion of the lateral wall portion, and
the vertical wall portion, the lateral wall portion, and the hanging wall portion are configured to diffract a sound wave of noise, that travels outwardly in the vehicle width direction from a vehicle underfloor space, and lead the sound wave to the penetrating portion.

8. The rocker exterior component structure according to claim 6, wherein:
the rocker molding further includes a bent portion which is bent into a curved shape in a vehicle front view, the bent portion ranging from a lower end portion of the vertical wall portion to the inner end portion of the bottom wall portion, and
the sound absorbing material includes a curved portion provided in a lower end portion of the sound absorbing material, the curved portion being bent into a curved shape along the bent portion in the vehicle front view.

9. The rocker exterior component structure according to claim 6, wherein the rocker molding is made of resin.

10. The rocker exterior component structure according to claim 6, wherein the sound absorbing material is a porous structure body.

11. The rocker exterior component structure according to claim 6, wherein the penetrating portion includes a plurality of through-holes provided along the vehicle front-rear direction.

12. The rocker exterior component structure according to claim 6, wherein
the vertical wall portion overlaps the rocker in the vehicle upper-lower direction, and
the side wall portion does not overlap the rocker in the vehicle upper-lower direction.

13. The rocker exterior component structure according to claim 7, wherein
the rocker includes:
a lower wall portion having an outer end portion and an inner end portion opposed to each other in the vehicle width direction, and
a lower flange extending downwardly in the vehicle upper-lower direction from the inner end portion of the lower wall portion,
the lateral wall portion is arranged below and along a lower surface of the lower wall portion of the rocker, and
the hanging wall portion extends along the lower flange of the rocker, and is outwardly spaced from the lower flange of the rocker in the vehicle width direction by a gap.

14. The rocker exterior component structure according to claim 13, wherein
a lower end of the hanging wall portion is lower than a lower end of the lower flange of the rocker in the vehicle upper-lower direction.

15. The rocker exterior component structure according to claim 6, wherein
the rocker molding further includes:
a lateral wall portion provided under the rocker in the vehicle upper-lower direction, the lateral wall portion having an outer end portion and an inner end portion opposed to each other in the vehicle width direction, and
a hanging wall portion extending downwardly in the vehicle upper-lower direction from the inner end portion of the lateral wall portion,
the vertical wall portion extends downwardly in the vehicle upper-lower direction from the outer end portion of the lateral wall portion, and
a distance between the hanging wall portion and the vertical wall portion in the vehicle width direction is around a quarter of a wavelength of a noise frequency to be reduced.

16. The rocker exterior component structure according to claim 15, wherein
the noise frequency to be reduced is around 1000 Hz, and
the distance between the hanging wall portion and the vertical wall portion in the vehicle width direction is 6.0 cm to 8.5 cm.

17. The rocker exterior component structure according to claim 6, wherein the sound absorbing material is sheet-shaped.

18. The rocker exterior component structure according to claim 6, wherein
the sound absorbing material is sheet-shaped, and an outer peripheral portion of the sound absorbing material is attached by adhesive to an outer peripheral portion of the penetrating portion on an inner surface of the rocker molding.

19. The rocker exterior component structure according to claim 6, wherein
the sound absorbing material is sheet-shaped, and
an outer peripheral portion of the sound absorbing material is attached by adhesive to an outer peripheral portion of the penetrating portion on an outer surface of the rocker molding.

20. The rocker exterior component structure according to claim 6, wherein
the sound absorbing material is sheet-shaped, and
in the vehicle width direction, a spacing between the side wall portion and the sound absorbing material is greater than a thickness of the sound absorbing material.

* * * * *